United States Patent

Tompkin et al.

[11] Patent Number: 5,875,170
[45] Date of Patent: Feb. 23, 1999

[54] OPTICAL DATA CARRIERS AND READING DEVICES THEREFOR

[75] Inventors: Wayne R. Tompkin, Ennetbaden; Rene Staub, Cham, both of Switzerland

[73] Assignee: Landis & Gyr Technology Innovation AG, Zug, Switzerland

[21] Appl. No.: 30,966

[22] Filed: Feb. 26, 1998

Related U.S. Application Data

[62] Division of Ser. No. 571,603, Dec. 13, 1995, Pat. No. 5,754,520.

[30] Foreign Application Priority Data

Dec. 22, 1994 [CH] Switzerland ............................ 3883/94

[51] Int. Cl.$^6$ ...................................................... G11B 7/24
[52] U.S. Cl. .................................. 369/275.1; 369/44.23; 369/112
[58] Field of Search ............................ 369/275.1, 275.2, 369/44.23, 112, 110, 44.12, 44.24, 116, 44.39, 103, 44.11; 250/201.5

[56] References Cited

U.S. PATENT DOCUMENTS

| | | | |
|---|---|---|---|
| 4,686,663 | 8/1987 | Kühn | 369/46 |
| 5,018,127 | 5/1991 | Ando | 369/112 |
| 5,218,584 | 6/1993 | Gfeller | 369/44.12 |
| 5,754,520 | 5/1998 | Tompkin et al. | 369/275.1 |

FOREIGN PATENT DOCUMENTS

| | | |
|---|---|---|
| 376 673 | 7/1990 | European Pat. Off. . |
| 551 753 | 7/1993 | European Pat. Off. . |
| 552 887 | 7/1993 | European Pat. Off. . |
| 613 126 | 8/1994 | European Pat. Off. . |
| 61-134946 | 6/1986 | Japan . |
| 50-50788 | 3/1993 | Japan . |

*Primary Examiner*—Ali Neyzari
*Attorney, Agent, or Firm*—Proskauer Rose LLP

[57] ABSTRACT

An optical data carrier is written along data tracks with diffraction patterns, each diffraction pattern representing a predetermined bit sequence with n bits. The bit sequences of a diffraction pattern can be determined with a number n of photodetectors which is smaller than the number m of the possible different diffraction patterns. It is particularly provided that the number m is a power of two of the number n: $m=2^n$. The design of the diffraction pattern as a number of at most n juxtaposed diffraction elements which in the reading operation illuminate only a single photodetector permits simple production of an ROM and a WORM data carrier. If relief structures with an asymmetrical profile are also used as diffraction elements and if the reading device subjects the signals supplied by the photodetectors to an analysis operation and only then determines the bit sequence to be associated with a diffraction pattern, the number m of different diffraction patterns which can be read with a predetermined number n of photodetectors can be further increased. If the data carrier serves as a WORM memory with a high level of security in relation to forgeries and unauthorized manipulation, then the unaltered diffraction pattern 2 in the form of a security feature represents on the one hand the bit sequence and on the other hand a memory cell for a single bit.

13 Claims, 3 Drawing Sheets

OPTICAL DATA CARRIERS AND READING DEVICES THEREFOR

This is a division of application Ser. No. 08/571,603, filed Dec. 13, 1995 now U.S. Pat. No. 5,754,520.

BACKGROUND OF THE INVENTION

1. Field of the Invention

This invention relates generally to optical data carriers and reading devices therefor. The invention can be applied, for example, to an optical data carrier of the kind having diffraction patterns arranged along at least one data track, wherein each diffraction pattern represents a bit sequence with n bits and is selected in accordance with the bit sequence to be represented from a set of m different diffraction patterns. The invention can also be applied, for example, to a reading device for reading such a data carrier and a key provided with such a data carrier.

2. Description of the Prior Art

Such data carriers are suitable for example for the storage of text, video and audio information or other items of information such as for example biometric information which are to be available in the form of ROM data. Known data carriers of that kind are CDs (compact discs). Furthermore, such data carriers are also suitable for use as value-bearing cards which are difficult to copy or forge such as, for example, charge cards for the payment of telephone calls using the public telephone system, in which a large amount of information is to be stored in a restricted space.

It is known from European application EP 376 673, in the case of a CD, to arrange bar-like pits along the data tracks in different orientations, each orientation being associated with a different bit sequence. Photodetectors are provided for reading the bit sequence, the number of photodetectors being twice as great as the number of different orientations of the pits. In the best case the number of photodetectors provided is equal to the number of different orientations plus one.

An optical data carrier of the kind set forth in the classifying portion of claim 1 is known from European Application EP 613 126. Cells provided with diffraction gratings are present on the data carrier. Each cell is subdivided into a number n of surface portions, wherein associated with each surface portion is a diffraction grating involving different parameters such as line spacing and/or azimuth. Each surface portion diffracts an impinging reading light beam as beam portions in different directions if it represents a bit of the value "1", and it diffracts no light if it represents a bit of the value "0". The bit sequence stored in a cell is thus read out simultaneously. As the surface portions are arranged in side-by-side relationship, the surface area demanded by a bit sequence is relatively large in comparison with a pit representing a single bit.

Thermoplastic materials are also known which can be embossed with microscopically fine relief structures. The relief structures can be locally and irreversibly altered by the application of heat energy.

SUMMARY OF THE INVENTION

An object of the present invention is to propose an optical data carrier which has a high storage density and which is simple to manufacture and which if necessary serves as a WORM (Write Once Read Many times) memory and affords a high level of safeguard against attempted forgery or unauthorised attempts at manipulation.

In accordance with one aspect of the invention there is provided an optical data carrier having diffraction patterns arranged along at least one data track, wherein each diffraction pattern represents a bit sequence with n bits and is selected in accordance with the bit sequence to be represented from a set of m different diffraction patterns where n is less than m, each said diffraction pattern being arranged to diffract a light beam which impinges thereon in a defined direction of incidence as beam portions in predetermined reflection directions, the number of said reflection directions of said set of diffraction patterns having equal to the number n of bits in said bit sequence and each bit in said bit sequence being associated with a different reflection direction, wherein the intensity of each said beam portion determines the value of the corresponding bit.

Respective further aspects of the present invention are set forth below.

A first concept of embodiments of the invention is that provided for an optical reading device having a predetermined number of n photodetectors is a data carrier in which more or less complex diffraction patterns are arranged along data tracks. Each diffraction pattern represents a bit sequence of n bits, wherein a given photodetector is associated with each bit in the bit sequence. A set of m diffraction patterns is provided for representing all possible bit sequences, wherein the number of m is given by $m=2^n$. In the operation of reading the data carrier a reading beam of the reading device illuminates one diffraction pattern after the other, wherein each diffraction pattern diffracts light into those photodetectors whose bit is to be of the value "1" while no light is diffracted into those photodetectors whose bit is to be of the value "0". In that respect embodiments of the invention use in particular an arrangement of diffraction gratings with an asymmetrical profile so that the light of the reading beam is diffracted predominantly into a single predetermined direction in space or into a plurality of predetermined directions in space which can be determined independently of each other. In that respect embodiments of the invention make use of the knowledge that the physical properties of an optically effective diffraction grating are given by three parameters, namely the line spacing, orientation and profile, and it consequentially uses those properties to increase the data carrier information density.

In accordance with a second concept of embodiments of the invention the reading device includes a control and evaluation circuit which not only detects the photodetectors into which light is diffracted, but which also analyses the levels of intensity of the diffracted and detected beam portions. It is possible in that way further to increase the number m of diffraction patterns which can be read with n photodetectors and which can be represented as a bit sequence. It should be noted that such a bit sequence has more than n bits.

A data carrier which can be written to once can be embodied with a suitable technology which permits the diffraction characteristics of individual parts of a diffraction pattern to be altered once. In that respect each diffraction pattern, in the unwritten condition, comprises k diffraction gratings which are arranged in a surface in juxtaposed relationship, with an asymmetrical diffraction profile, and represents a bit sequence of k bits, wherein each bit is of the value "1". The operation of writing to the data carrier is effected with a reading device which, by the supply of energy, controlledly alters those diffraction gratings of the bit pattern, which are afterwards to represent a bit "0".

A CD which can be in the form of a ROM (Read Only Memory) or a WORM (Write Once Read Many times), and a data carrier which permits the production of an optically codeable key, are presented as examples of use of such optical data carriers.

In order to enhance the level of safeguard against forgeries and/or unauthorised attempts at manipulation, it is further proposed in accordance with the invention that each memory cell comprises at least one diffraction element which diffracts impinging light as beam portions in a plurality of directions. From the signals of photodetectors suitably arranged in the reading device, a bit sequence can be associated with each unaltered diffraction element. That bit sequence represents a security feature and can contain for example items of information such as a country code or an expiry date etc.

The data carrier may include further diffraction structures which serve to guide the writing/reading beam or contain the items of address information, items of function information or items of format information.

BRIEF DESCRIPTION OF THE DRAWINGS

The above and other objects, features and advantages of the invention will be apparent from the following detailed description of the illustrative embodiments which is to be read in connection with the accompanying drawings, in which.

DESCRIPTION OF THE PREFERRED EMBODIMENTS

Figure 1:
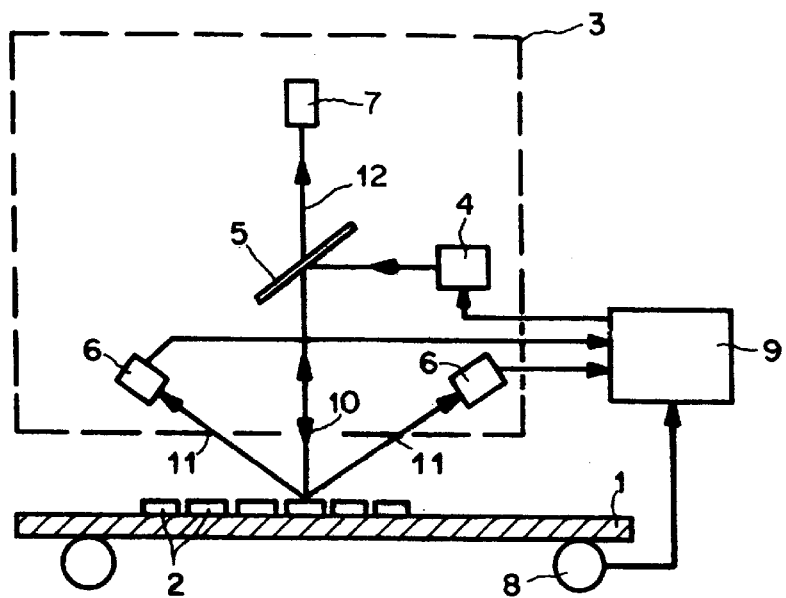
FIG. 1 shows a reading device for a data carrier with optical diffraction patterns.

FIG. 1 shows a reading device for reading a data carrier 1 with optically effective diffraction patterns 2, wherein each diffraction pattern 2 represents a bit sequence with n bits. The diffraction patterns 2 are arranged along at least one data or information track. The reading device has a reading head 3 with a light source 4, a beam splitter 5 and photodetectors 6, 7, a transport device 8 and a control and evaluation circuit 9. The light source 4 serves for reading the bit sequence represented by a diffraction pattern 2, by means of a light beam 10 which is incident on the diffraction pattern 2 in a defined, for example perpendicular direction of incidence, and which is diffracted in the form of beam portions 11, 12 in predetermined reflection directions. The number of possible reflection directions is equal to the number n of bits in the bit sequence. One of the photodetectors 6 is associated with each reflection direction and a predetermined bit in the bit sequence is associated with each photodetector 6. The value of each bit is determined in consideration of the level of intensity of the beam portion 11 which is diffracted into the associated reflection direction. The photodetector 7 is provided for measuring the level of intensity of the reflected beam portion 12 which corresponds to the zero diffraction order, this being possible by virtue of the use of the beam splitter 5. The transport device 8 serves for relative movement between the data carrier 1 and the reading head 3 so that each diffraction pattern 2 is individually readable. Optical imaging elements such as aperture devices or objective lens systems which serve for optimum beam guidance are not shown. The proposed reading device is provided for reading a data carrier 1 in a reflection mode. It is equally possible to use a design in which the light which is transmitted and diffracted by the diffraction patterns 2 is measured. The light source 4 used is preferably a semiconductor light-emitting diode whose light is more or less monochromatic so that the divergence of the beam portions 11 is as small as possible.

The provision of data tracks on a CD-ROM and reading devices for reading the data are known. The arrangement of one or more information tracks on a credit medium which inter alia can be used as a value-bearing card is known from Swiss patent specification No. 574 144. The arrangement of such data or information tracks on a data carrier 1 and also the detailed geometrical structure of a reading device for optically reading the information stored on such a data carrier 1 are therefore not described in greater detail here.

Figure 2:
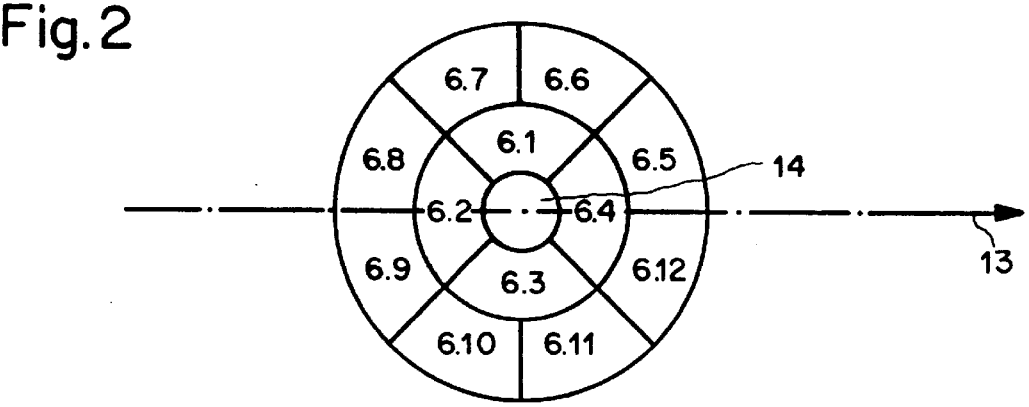
FIG. 2 shows an arrangement of photodetectors in such a reading device.

FIG. 2 shows a possible arrangement of twelve photodetectors 6.1 to 6.12 in a plane which is perpendicular to the light beam 10 (FIG. 1), wherein each of the photodetectors 6.1 to 6.12 is associated with a restricted surface portion of that plane and thus covers a predetermined solid angle. Four photodetectors 6.1 to 6.4 are arranged on an inner circular ring while eight photodetectors 6.5 to 6.12 are arranged on an outer circular ring. The orientation of the photodetectors 6.1 to 6.12 in relation to the data track of the data carrier 1 is evident with reference to the arrow 13 which gives the direction of the data track. Provided within the circular rings is a hole 14 through which the light beam 10 is incident on the diffraction pattern 2. For measuring the directly reflected beam portion 12, a further photodetector 7 can be provided above the beam splitter 5, as shown in FIG. 1. That photodetector 7 can be for example in the form of a CCD (charge coupled device) or in the form of a quadrant detector and can be part of a focusing device.

The twelve photodetectors 6.1 to 6.12 serve for reading a bit sequence which is formed from twelve binary digits and which is represented by the diffraction pattern 2. There is therefore a set of $2^{12}=4096$ different diffraction patterns 2 which differ in terms of diffraction of the light beam 10 incident thereon. The term "different" means here that two diffraction patterns 2 which are identical in respect of profile and line spacing and which differ only in respect of their orientation relative to the data track are to be considered as two diffraction patterns 2. The diffraction pattern 2 which represents the bit sequence "000000000101" diffracts the light beam 10 into two beam portions 11 of which the first beam portion 11 impinges on the photodetector 6.1 and the second beam portion 11 on the photodetector 6.3. The diffraction pattern 2 which represents the bit sequence "001000000101" diffracts the light beam 10 into three beam portions 11 which light the photodetectors 6.1, 6.3 and 6.10. A reflection direction is associated with each bit of the bit sequence and one of the photodetectors 6.1 to 6.12 is associated with each reflection direction. The reflection directions are predetermined by the direction of incidence of the light beam 10 relative to the diffraction grating 2, the physical parameters of the diffraction pattern 2 and the wavelength or the spectral range of the light source 4, and is the same for the entire set of $2^n$ diffraction patterns 2. The number of reflection directions is equal to the number of photodetectors 6.1 to 6.12 and is thus also equal to the number n of bits in the bit sequences.

Figure 3:
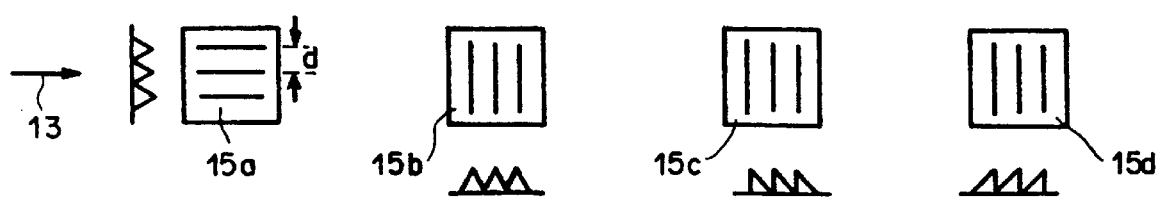
FIG. 3 shows diffraction patterns.

FIG. 3 shows the profile and orientation in relation to the data track of four diffraction elements 15a, 15b, 15c and 15d. The diffraction elements 15a, 15b, 15c and 15d are selected examples of a set of 16 diffraction patterns 2 which, because of the equation $2^4=16$, are suitable for representing bit sequences with four bits and can thus represent the numbers of 0 to 15 or 1 to 16 or any characters from a set of 16 characters. Provided for reading them out is a reading device which includes only the four photodetectors 6.1 to 6.4 arranged on the inner circular ring (FIG. 2). The first diffraction element 15a is a phase diffraction grating with a symmetrical profile so that perpendicularly incident monochromatic light is uniformly diffracted into the plus first and the minus first diffraction orders. The grating lines are arranged parallel to the direction defined by the data track and the grating spacing d is so matched to the wavelength I or the spectral range L of the light beam 10 (FIG. 1) that the light diffracted into the plus first diffraction order impinges as a first beam portion 11 on the photodetector 6.1 and the light which is diffracted into the minus first diffraction order impinges as a second beam portion 11 on the photodetector 6.3. By virtue of the orientation of the photodetectors 6.1 to 6.4 relative to the data track, as can be seen from FIG. 2, no light impinges on the other photodetectors. The two photodetectors 6.1 and 6.3 supply a signal $S_1$ and $S_3$ respectively with a comparatively high voltage level as the strengths thereof are proportional to the intensity of the beam portions 11 impinging thereon while the photodetectors 6.2 and 6.4 produce signals $S_2$ and $S_4$ respectively with a low voltage level which can be interpreted as a dark signal. The control and evaluation circuit 9 analyses the signals $S_1$ to $S_4$ as meaning that a bit of the value "0" is associated with a signal with a low voltage level and a bit of a value "1" is associated with a level above a predetermined threshold value. Thus, a bit can be determined from the signal of each of the photodetectors 6.1 to 6.4, wherein the position of the bit in the bit sequence, on the basis of the number of the associated photodetector, is fixedly so predetermined that the first diffraction element 15a is interpreted as bit sequence "0101" or as the number "5". The second diffraction element 15b is identical to the first diffraction element 15a with the exception that the grating lines are directed perpendicularly to the direction of the data track. The light of the plus first diffraction order thus impinges on the photodetector 6.2 and the light of the minus first diffraction order impinges on the photodetector 6.4. The second diffraction element 15b therefore represents the bit sequence "1010" or the number "10".

An optical phase diffraction grating with an asymmetrical profile diffracts more light for example into the plus first than into the minus first diffraction order. In the case of a grating with a sawtooth-shaped profile the relationship of the levels of intensity of the plus first to the minus first diffraction orders may vary in a wide range and may be for example 8:1. With such a grating and the orientation thereof parallel or perpendicularly to the data track therefore it is possible to produce four further diffraction elements 15 which are suitable for representing the bit sequences "0001", "0010", "0100" and "1000". Besides the two diffraction elements 15a and 15b with a triangular symmetrical profile, FIG. 3 shows two diffraction elements 15c and 15d with a sawtooth-shaped asymmetrical profile. With the symmetrical diffraction elements 15a and 15b the photodetectors 6.1 to 6.4 supply signals $S_1$ to $S_4$ at two different levels $P_1$ and $P_2$, while with the asymmetrical diffraction elements 15c and 15d they supply signals $S_1$ to $S_4$ at three different levels $P_1$, $P_3$ and $P_4$. If the profile of the triangular diffraction gratings 15a and 15b and the profile of the sawtooth-shaped diffraction gratings 15c and 15d are matched to each other in the optimum fashion so that the condition $P_1, P_3 << P_2, P_4$ is met, it is sufficient to establish a single threshold value so that the control and evaluation circuit 9 can associate a bit "0" with a signal at a level below the threshold value and a bit "1" with a signal at a level above the threshold value. The reliability of association of the respective bit sequence with a diffraction element 15 can be increased if the control and evaluation circuit 9 performs a test to ascertain whether, with two diametrally mutually oppositely disposed photodetectors 6, the signal of the first photodetector 6 is larger or smaller by a predetermined factor than the signal of the second photodetector 6, or whether the two signals are the same within predetermined tolerance values. By virtue of that checking operation it is possible reliably to distinguish diffraction gratings 15 with symmetrical and asymmetrical profiles respectively, and the corresponding bit sequence "0101", "0001" and "0100" respectively can be clearly associated with the respective diffraction elements 15b to 15d in FIG. 3.

With asymmetrical gratings whose grating lines are turned relative to the data track through an angle of 45°, −45°, 135° and −135° respectively, it is possible to produce diffraction elements 15 which represent the bit sequences "1001", "1100", "0110" and "0011".

The bit sequence "0000" can be produced by a surface which does not diffract the light beam 10 so that each of the photodetectors 6.1 to 6.4 produces a bit "0", and the bit sequence "1111" can be produced by a for example diffusely reflecting scatter surface which illuminates the four photodetectors 6.1 to 6.4 uniformly and so strongly that each of the photodetectors 6.1 to 6.4 produces a bit "1".

Two-dimensional grating structures are suitable for representing the bit sequences "1110", "1101", "1011" and "0111", which grating structures are produced by superimposition of a grating with a symmetrical profile and a grating with an asymmetrical profile, wherein the grating lines of the one grating are directed parallel to the data track and the grating lines of the other grating are directed perpendicularly to the data track.

Therefore all bit sequences from "0000" to "1111" can be represented by m=16 diffraction patterns 2 which can be read by n=4 photodetectors 6.1 to 6.4. Therefore $m=2^n$. However those bit sequences can also be produced with diffraction gratings other than those described above. Finding diffraction gratings 2 which are intended to diffract incident light as different beam portions of predetermined directions in space falls in the area of the inverse scattering problem.

If the photodetectors 6 which are disposed in mutually diametrally opposite relationship in FIG. 2 are arranged displaced relative to each other so that they are no longer diagonally opposite to each other, the use of gratings with symmetrical profiles is also suitable for representing all bit sequences. In that case gaps are to be provided between the photodetectors 6 so that the first beam portion 11 which is diffracted by a grating with a symmetrical profile and which corresponds to the plus first diffraction order impinges on a photodetector 6 while the second beam portion 11 which corresponds to the minus first diffraction order impinges onto a gap and produces no signal. The number of photodetectors which can be arranged on a circular ring depends on the dimensions of the reading device and the capability of the provided diffraction patterns 2 to divide up the reading light beam 10 into spatially adequately separated beam portions 11.

The grating constant d of a diffraction element 15 which can be written to as a grating is advantageously selected to be so small that, on the basis of the elementary relationship $d*\sin\theta_h = h*\lambda$, wherein $\theta_h$ is the diffraction angle of the h-th diffraction order, $\lambda$ is the wavelength of the monochromatic light beam 10 and h is an integer, $d<2*\lambda$, so that the light of the light beam 10 is diffracted only into the plus and minus first diffraction orders. With a preferred wavelength $\lambda$ of 780 nm, as commercially available inexpensive laser diodes have, there is a maximum grating spacing of $d_{max}=1.56$ μm, that is to say a line number of more than 640 lines/mm.

If the number of photodetectors 6 is increased to twelve, which are arranged as shown in FIG. 2, the grating constant d of the diffraction gratings which are to diffract the light of the light beam 10 into the photodetectors 6.5 to 6.12 on the outer circular ring is to be selected to be so small that a correspondingly large diffraction angle results, so that substantially no light is diffracted into the photodetectors 6.1 to 6.4 on the inner circular ring.

A diffraction element 15 in the form of a grating requires at least five to ten grating lines and thus occupies an area of the order of magnitude of 5 μm*5 μm to 10 μm*10 μm so that, when using twelve photodetectors, the bit density is of the order of magnitude of $10^7$ to $10^8$ bits/cm².

Figure 4:
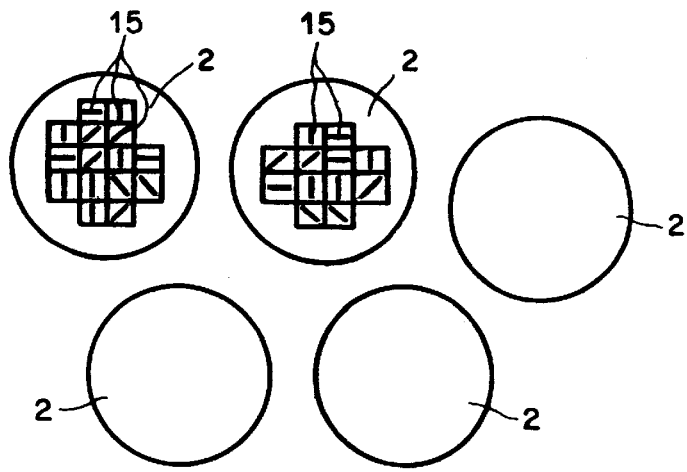
FIG. 4 shows a diffraction pattern which is composed of diffraction elements.

Even higher bit densities can be achieved if the number n of the photodetectors 6 is increased for example by 16, that is to say to 28. To provide $2^{28}=268435456$ bit sequences, an area of 100 μm² is then scarcely sufficient and the determination of $2^{28}$ different grating patterns 2 becomes economically unattractive, if not virtually impossible. In such a case it is desirable to arrange a number p of characteristic diffraction elements 15, as shown in FIG. 4, in juxtaposed relationship in a matrix-like fashion to form a diffraction pattern 2, wherein each diffraction element 15 illuminates one of the p photodetectors 6 which is to be illuminated and whose signal is to give a bit "1". No diffraction element 15 is to be provided for the photodetectors 6 which are to output a signal corresponding to the bit "0". Thus each diffraction pattern 2 which is to represent a bit sequence with for example three ones has only p=3 diffraction elements 15. A grating with an asymmetrical profile is preferred as the diffraction element 15. If however two diametrally oppositely disposed photodetectors 6 are simultaneously to measure a bit "1", a diffraction element 15 with a grating having a symmetrical profile can be used instead of two diffraction elements 15 with gratings with an asymmetrical profile. The grating orientation is indicated in FIG. 4 within the diffraction element 15 by a single grating line. Accordingly the area required for representing a bit sequence with n binary digits is at most n-times the area of 25 μm² to 100μm² of a diffraction element 15. It is possible in this technologically simple manner to achieve bit densities of $10^8$/cm², wherein each diffraction pattern 2 associated with an individual bit sequence can be afforded by a simple matrix-like arrangement of diffraction elements 15. The arrangement of the diffraction elements 15 within a single diffraction pattern 2 is advantageously provided on a circular area. The diameter of the light beam 10 is matched to the diameter of that area. The diffraction patterns 2 are at a mutual spacing which prevents cross-talk. In order to obtain the highest possible bit density, the data tracks are so provided that the circular diffraction patterns 2 are packed as closely as possible. It is possible by means of a computer program to calculate the levels of light intensity which, in the case of a provided arrangement, fall on the various photodetectors 6, and possibly optimise same by using suitable diffraction elements 15.

The number m of different diffraction patterns 2 is equal to the n-th power of the number two: $m=2^n$, wherein n denotes the number of photodetectors in the reading device. In that respect the photodetector 7 (FIG. 1) is possibly not also counted, serving to measure the level of intensity of the undiffracted beam portion 12 (zero diffraction order). With suitable matching of the diffraction elements 15 which produce the individual bits of the bit sequence, with a diffraction pattern 2, the control and evaluation circuit 9 has only the function of checking the signals supplied by the photodetectors 6, for low and high voltage levels respectively. The information density however can be further increased if the control and evaluation circuit 9 is adapted to effect further analyses of the signals produced by the photodetectors 6.

In particular the use of diffraction structures which, when irradiated with a light beam 10, produce beam portions 11 of different levels of intensity, permits a further increase in the number of different diffraction patterns 2 which can be read and interpreted with a predetermined number of photodetectors 6 as a bit sequence. The following example assumes that the reading device includes four photodetectors arranged on a circular ring, like for example the photodetectors 6.1 to 6.4 shown in FIG. 2. The data carrier 1 Includes, along the data tracks, diffraction patterns 2 which are formed from diffraction elements 15 which are arranged in juxtaposed relationship, as shown in FIG. 4. In that respect it is provided that possibly at least two diffraction elements 15 which are in the form of diffraction gratings with a sawtooth-shaped profile can be associated with each of the photodetectors 6.1 to 6.4, wherein the ratio of the levels of intensity of the plus first to the minus first diffraction orders in the case of the first grating is 4:1 and in the case of the second grating it is 8:1. Although there are only four photodetectors, it is possible to read diffraction patterns 2 which represent bit sequences with eight bits: if only the first grating is present in the diffraction pattern 2 for the photodetector 6.1, then the photodetector 6.1 supplies a signal of a strength $R_1$. If there is only the second grating, then the photodetector 6.1 supplies a signal of a strength $R_2$, wherein $R_2 \cong 2*R_1$. If both diffraction gratings are present, then the photodetector 6.1 supplies a signal of a strength $R_3$, wherein $R_3 = R_2 + R_1 \cong 3*R_1$. The strength of the beam portion which falls on the photodetector 6.3 and which originates from diffraction in the minus first diffraction order, is in the last and worst case $R_4 \cong \frac{1}{2}*R$. By means of analysis of the signal strength by the control and evaluation circuit 9, the three cases can be clearly distinguished and it is possible to associate with the corresponding diffraction patterns 2 the bit sequences "#0#0#0#1", "#0#1#0#0" and "#0#1#0#1" respectively. The first and fifth bit from the right are assigned to the photodetector 6.1, while similarly, the second and sixth bit from the right are assigned to the photodetector 6.2, and so on. The character "#" is a place-holder for a respective bit whose value depends on whether and how strongly the other photodetectors 6.2 to 6.4 are illuminated. In order to represent the bit sequences "#0#0#0#1" and "#1#1#1#1", for example, two diffraction gratings with a symmetric profile are required. These diffraction gratings illuminate both the photodetectors 6.1 and 6.3 with beam portions 11 of equal intensity, where the intensities in the former and latter case are approximately equal to the values $R_1$ and $R_2$, respectively. Therefore two bits of the bit sequence are associated with each of the photodetectors 6.1 to 6.4, wherein the place thereof is predetermined in the bit sequence. In analysis of the signals it is possible not to take account of the absolute levels of intensity of the beam portions 11, but the levels of intensity which are related to the intensity of the zero diffraction order or the sum of the levels of intensity of light which are diffracted on to the photodetectors 6. In this embodiment therefore the number k of reflection directions or the associated photodetectors 6 is smaller by a factor two than the number n of bits of the bit sequence.

A once-writable data carrier 1 can be produced in a simple fashion by a plurality of identical diffraction patterns 2 being embossed along one or more data tracks into a data carrier 1 of thermoplastic material, wherein each diffraction pattern 2 comprises n diffraction elements which are arranged in juxtaposed relationship in a matrix-like arrangement so that each diffraction pattern 2 represents a bit sequence of n ones. The operation of writing any bit sequence is effected by varying those diffraction elements 15 which, after the writing operation, are to produce a bit "0" in the associated photodetector of a reading device. That variation can be produced in a writing device for example by supplying thermal or electrical energy.

Figure 5:
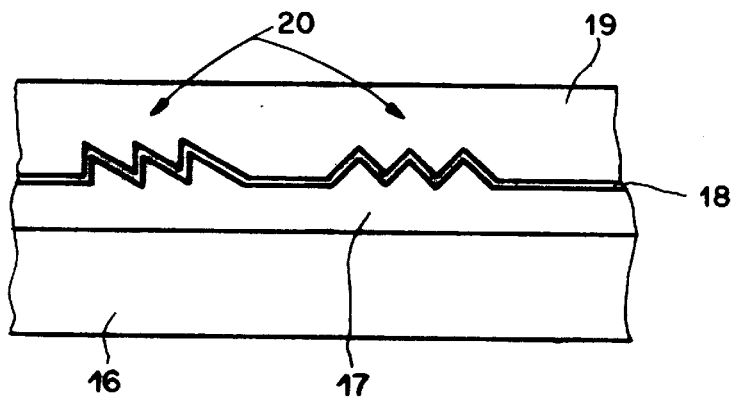
FIG. 5 is a view in cross-section of a CD.

FIG. 5 shows a view in cross-section of a CD which serves as a ROM or WORM data carrier 1. The CD has a disc-like substrate 16 which either comprises thermoplastic material or is covered with a thermoplastic lacquer layer 17. A reflection layer 18 and a cover layer 19 are applied in to succession to the substrate 16 and the lacquer layer 17 respectively. Relief structures 20 are formed in the lacquer layer 17 and the reflection layer 18, for example by embossing or moulding. The relief structures 20 represent phase-diffracting diffraction patterns 2 (FIG. 4) which are formed from diffraction elements 15 arranged in juxtaposed relationship. The cover layer 19 is a thermally stable lacquer which can advantageously be hardened by ultra-violet light and whose softening point is about 20° C. higher than the softening point of the lacquer layer 17. That provides that the diffraction characteristics of individual diffraction patterns 2 are variable by the application of thermal energy by means of an erasing head, as is described for example in Swiss patent specification No. 640 075, without the side of the data carrier 1 which is towards the erasing head, tending to stick to the erasing head. Swiss patent specification No. 604 146 describes how, with the local action of heat, an optically effective relief pattern 20 which is embossed into a plastic material surface is altered at the heated location in such a way that the structure which the plastic material surface had prior to the embossing operation is reformed. A data carrier 1 with diffraction patterns 2 which are of an identical configuration after the embossing operation can be written with data by altering individual diffraction elements 15. A further known process for simple writing lies in the use of a guided laser beam for locally removing the reflection layer 18 at the diffraction elements 15 which are respectively provided in accordance with a bit sequence to be represented so that no light or comparatively little light is reflected into the photodetectors which are to produce a bit "0".

Figure 6:
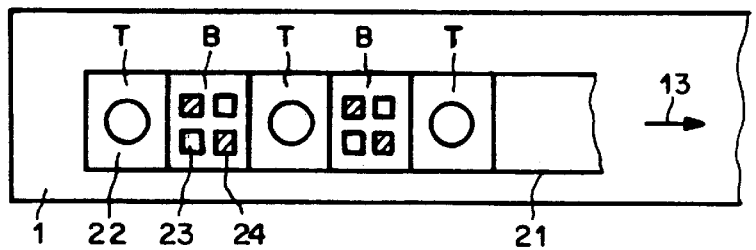
FIG. 6 is a plan view of a data carrier which is suitable for an optically codeable key.

FIG. 6 shows an optical data carrier 1 with a single data track 21 with clock and information regions T and B respectively which are arranged in alternate succession in the track direction 13. Provided in each clock region T is a bordered area 22 with a diffraction grating having a symmetrical profile, such as for example the diffraction grating 15b shown in FIG. 3. Provided in each information region B is at least one bordered area 23 with a diffraction grating having an asymmetrical profile of a first kind, such as for example the diffraction grating 15c shown in FIG. 3, and at least one bordered area 24 with a diffraction grating having an asymmetrical profile of a second kind, such as for example the diffraction grating 15d shown in FIG. 3. In this form the information regions B still do not represent any readable information. The operation of writing information to such a data carrier 1 is effected by a procedure whereby either all areas 23 or all areas 24 in each information region B are so altered that they no longer diffract the light beam 10 of a reading head 3 (FIG. 1) into the photodetectors 6. The line spacing and orientation of the diffraction gratings are preferably selected to be the same so that, in the reading operation, an information region B with areas 23 diffracts more light of the light beam 10 into the first photodetector 6, while an information region B with areas 24 diffracts more light of the light beam 10 into the second photodetector 6. A clock region T diffracts approximately the same amount of light of the light beam 10 into both photodetectors 6. The control and evaluation circuit 9 determines similarly to the manner already described above for each information region B on the basis of the levels of light intensity whether a bit "0" or a bit "1" is to be associated therewith. The clock regions T ensure that successive bits of the same kind in the data carrier 1 can be satisfactorily read. Such a data carrier 1 can be read by means of a reading device provided with only two photodetectors 6. In addition such a data carrier 1 can scarcely be forged as the bits representing the useful information can be produced only by a variation either of all areas 23 or all areas 24. Any other variation results in a character which can no longer be read. As each individual bit in addition has the physical property, which is difficult to forge, that the intensity of the two diffracted beam portions must correspond to a predetermined relationship, overall this affords a very high level of security in regard to forgeries if the reading device is adapted to perform an authenticity checking operation of that kind.

Figure 7:
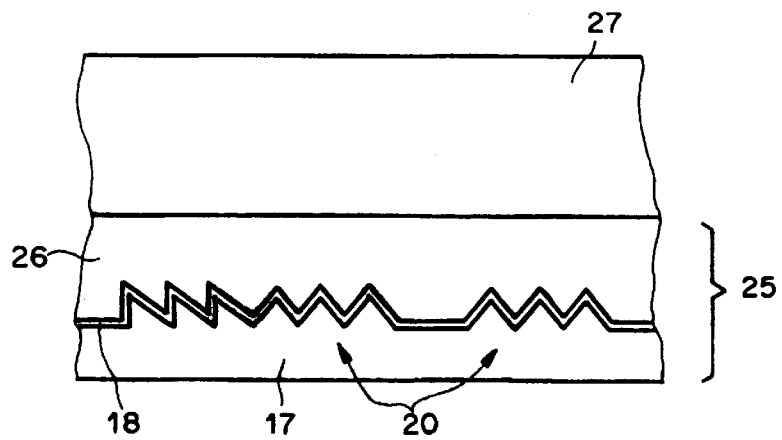
FIG. 7 shows the configuration of such a data carrier in the form of a laminate of plastic foils.

As shown in FIG. 7 the data carrier 1 is preferably in the form of a laminate 25 of plastic foils. The laminate 25 comprises a lacquer layer 17, a reflection layer 18 and an adhesive layer 26, and is connected to a carrier foil 27. The diffraction gratings are embedded in the form of relief structures 20 in the lacquer layer 17 and the reflection layer 18.

Such a data carrier 1 can be applied to a key for example by means of a transfer process in which the carrier foil 27 is removed, and used for coding the key. The lock associated with the key includes a reading device of the kind shown in FIG. 1. The code of the key, upon being introduced into the lock, can be automatically read with only two photodetectors. The reading device may also have more than two photodetectors so that the data density on the key can be further increased by the use of more complex diffraction patterns 2. If it has for example ten photodetectors and if each key has a single diffraction pattern, then $2^{10}=1024$ different keys can be produced, which can scarcely be forged and which can be statically read in the lock. In that respect any number of different keys can be produced by the combination of optical coding with mechanical coding of the key.

In terms of security uses, it is appropriate for the diffraction patterns 2 stored on the data carrier also to be locally correlated or cryptographically encoded so that the bit sequence which occurs after reading of the diffraction patterns 2 in the sequence thereof which is predetermined on the data carrier 1 along the data track is understandable only after suitable further processing.

Figure 8:
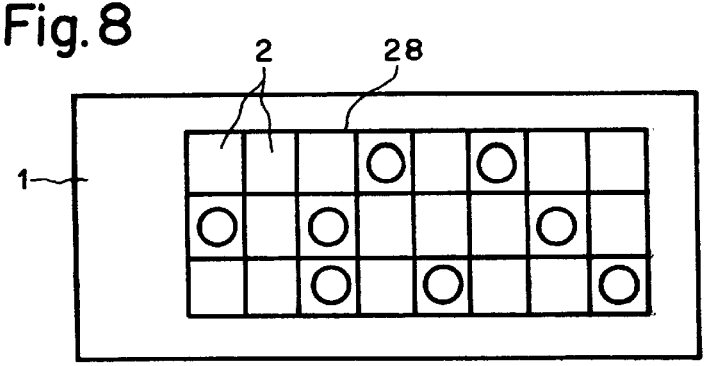
FIG. 8 shows a data carrier in the form of a WORM memory.

FIG. 8 shows a data carrier 1 with an optical WORM memory 28. The WORM memory 28 comprises diffraction patterns 2 which are arranged matrix-like in side-by-side relationship in k columns and h rows. Each intact diffraction pattern 2 diffracts the light beam 10 which impinges in a predefined direction of incidence in the form of beam portions 11, 12 (FIG. 1), in one or more specific reflection directions. The reflection directions themselves are predetermined and the number thereof is p. Accordingly both data carriers 1 of the most widely varying kinds and also different diffraction patterns 2 on the same data carrier 1 can be read with a universal reading device.

In the example shown in FIG. 8 there are provided two types A and B of diffraction patterns 2 which are arranged in alternate sequence ABAB . . . . Each individual diffraction pattern 2 performs at least two functions: on the one hand it represents an encoded security element in the form of a bit sequence comprising p bits, while on the other hand it represents a memory cell for a single bit with the binary value "1" or, after deliberate alteration, with the binary value "0". The memory capacity of the WORM memory 28 is thus k*h bits.

In the reading mode, from the intensity of the beam portions 11, 12 which are diffracted at an individual diffraction pattern 2, the reading device determines a bit sequence having p bits. The bit sequence represents an item of encoded information which on the one hand contains details about the type A or B of the diffraction pattern 2 and on the other hand further details such as for example a country code, an expiry date etc. The memory value of the diffraction pattern 2 is interpreted as a bit with the binary value "1" if the bit sequence represents a valid code. If the read bit sequence is equal to the bit sequence "00..0", the memory value of the diffraction pattern 2 is interpreted as a bit with the binary value "0". If the bit sequence represents an invalid code but was read as a bit sequence which is different from the bit sequence "00..0", it is deemed to be an invalid character which is interpreted neither as bit "1" nor as bit "0". The complexity of the diffraction pattern 2 and therewith the degree of difficulty in simulating the code with fraudulent intent increases with the number p of directions.

The irreversible alteration in the individual diffraction pattern 2 can be effected by the application of heat energy. The alteration must be such that the diffraction pattern 2 can no longer produce the beam portions 11, 12 corresponding to the type of diffraction pattern, or can no longer do so with sufficient intensity, so that in the reading operation the reading device establishes the bit sequence "00..0". In FIG. 8 some diffraction patterns are marked with a ring which marks the altered area within the surface occupied by the diffraction pattern 2. Surfaces of a diameter of about fifty micrometres can be altered without any problem with the laser beam of a reading device which is equipped with simple components, so that the bit density reaches 40 kbit/cm$^2$. The reading device is advantageously equipped with a laser which can be switched into a high-power mode for the writing operation and a low-power mode for the reading operation. The laser beam therefore serves both for reading the bits and also for writing bits. The reflection layer 18 (FIG. 5) is advantageously a metal layer which strongly absorbs the laser light so that the WORM memory 28 can be written to with the minimum amount of energy. Suitable metals are for example Cr, Te etc. The layer 17 (FIG. 7) through which the light beam 10 passes in the writing operation is advantageously also doped with a material for absorbing the laser light so that the heat energy required for the writing operation can be supplied at the lowest possible level of energy expenditure.

In the simplest case the diffraction pattern 2 is a diffraction grating with a symmetrical or asymmetrical profile shape which diffracts light predominantly in two or a single direction respectively. Reading and writing directly mutually adjoining memory cells is simplified by the alternate arrangement of diffraction patterns 2 as the reading device repeatedly receives items of information about the size of the memory cells from unaltered diffraction patterns 2. If however the diffraction patterns 2 are identical and directly adjoin each other, the subdivision of the WORM memory 28 into columns and rows on the data carrier 1 is only fictitious. The consequence of this is that for example the reading device must be adapted when reading along a data track to determine the value of each bit out of the configuration in respect of time of the signals supplied by the photodetectors. If for example four bits of the value "1" follow each other, then the photodetectors which respond in accordance with the code supply a high signal for a time duration of four units of time, while with a bit sequence "1101" a high signal firstly occurs 30 during two units of time and then a low signal during one unit of time and then again a high signal during one unit of time. Another possibility is that of providing a clock track in addition to the data tracks so that each bit can be correctly addressed.

A WORM memory 28 which is particularly secure in regard to reading and manipulation is afforded if every two diffraction patterns 2 of a different type form a respective memory cell. The memory cell then represents a bit of the value "1" if the first diffraction pattern 2 is unaltered and the second diffraction pattern 2 is altered. The memory cell represents a bit of the value "0" if the first diffraction pattern 2 is altered and the second diffraction pattern 2 is unaltered. Both a bit "1" and also a bit "0" must be written and erasure of the written bit is not possible. The memory capacity of such a WORM memory 28 is h*k/2. Another possible way of protecting bits from unauthorised alterations involves using a three-out-of-five code or the like, that is to say, of five interrelated diffraction patterns 2, there are always three that are altered and two that are unaltered, so that the information stored in the five diffraction patterns 2 represents a valid character comprising a plurality of bits.

Figure 9:
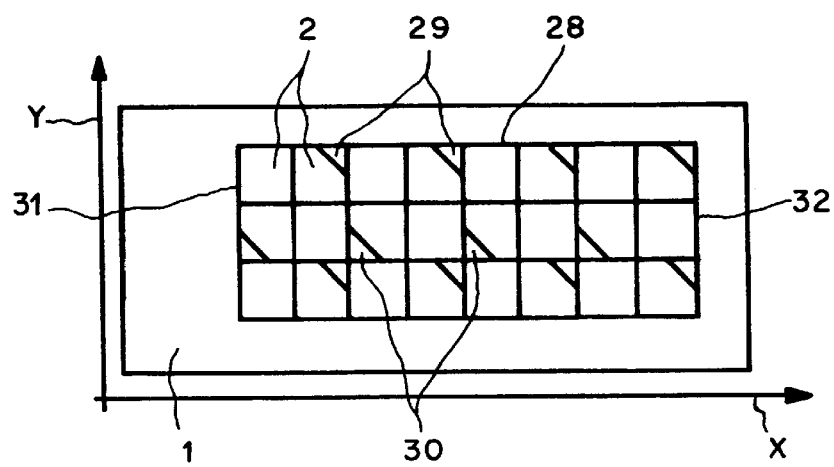
FIG. 9 shows the WORM memory provided with address information.

In a development which is shown in FIG. 9, there are further location-dependent diffraction structures 29, 30 which contain information about the x- and y-coordinates respectively on the WORM memory 28. The diffraction structures 29, 30 can be present, superimposed on the diffraction patterns 2, over the entire surface area of the WORM memory 28 or, as shown in FIG. 9, they may be present only in selected surface portions. An example of such a diffraction structure 29 is a one-dimensional diffraction grating whose line number continuously increases with increasing x-coordinate. The line number at the one edge 31 of the WORM memory 28 is for example 300 lines/mm, at the opposite edge 32 it is 1500 lines/mm. As the diffraction angle of a monochromatic reading beam which impinges on the diffraction grating 29 depends on the number of lines, the corresponding coordinate can be determined by means of a position-sensitive photodetector arranged in the reading device. The diffraction structures 29, 30 are arranged orthogonally relative to each other. Such diffraction structures 29, 30 which contain items of information about the location on the data carrier 1 permit the use of reading devices which manage with out a specific, high-accuracy positioning device, as the address for each individual or for example each tenth bit can be read off the data carrier 1. The diffraction structures 29, 30 which are necessary for address determination are of such a configuration that they scatter light in a different direction from the diffraction patterns 2.

Such additional diffraction structures may perform a multiplicity of possible functions. For example they may include items of information about the function of the diffraction patterns 2 so that certain diffraction patterns 2 form for example a ROM memory. They may also include format information.

Figure 10:
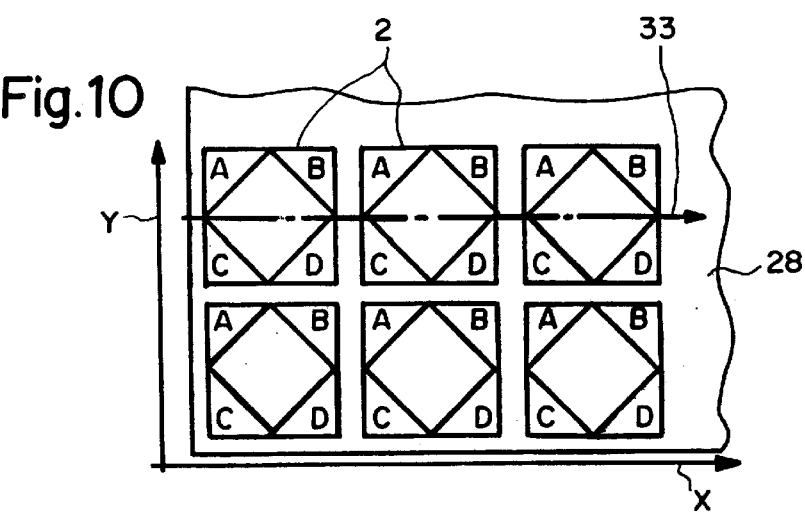
FIG. 10 shows the WORM memory with track guidance information.

FIG. 10 shows the WORM memory 28 with diffraction patterns 2 which serve as a memory cell and which include at least four surface portions. Each of the surface portions which are identified by A, B, C and D, in addition to the diffraction structures already described, has further diffraction structures which contain items of information for guiding the light beam 10 (FIG. 1) along a track 33. The reading device includes two photodetectors whose analog signal strengths are a measurement in respect of the deviation of the track 33 in the x- and y-direction respectively. The surface portion A diffracts light onto the first and onto the second photodetector. The surface portion B diffracts light onto the first photodetector and no light onto the second photodetector. The surface portion C diffracts light onto the second photodetector and no light onto the first photodetector. The surface portion D diffracts no light onto the two photodetectors. If the light beam 10 which is to be guided along the track 33 deviates from the ideal line, then, in accordance with the deviation, for example the signals which are characteristic in respect of the diffraction patterns 2 of type A and B increase while the signals which are characteristic in respect of the diffraction patterns 2 of type C and D decrease. The reading device is designed to use the signals from those photodetectors for track guidance of the light beam 10.

The examples described with reference to FIGS. 8–10 represent only a limited selection of many possible ways of carrying into effect the desired functions of storage, addressing, security and track guidance. The examples may be combined and altered as desired. To sum up it can be said that each memory cell with a diffraction pattern 2 diffracts the light beam 10 in predetermined reflection directions. A bit sequence can be determined from the intensities of the light which is diffracted in the reflection directions. Some bits of the bit sequence are identical for each unaltered memory cell of the data carrier 1; they represent a security feature. Further bits of the bit sequence contain predetermined items of information such as for example function or format details which are different for different memory cells. Further bits of the bit sequence are used as analog or digital signals for track guidance and/or addressing. Each memory cell on the other hand may store only a single-binary value. The use of relief structures of an asymmetrical profile shape which, upon being illuminated with the light beam 10, produces two beam portions 11, 12 (FIG. 1) with a predetermined ratio of intensity, also permits checking in respect of authenticity of the data carrier 1 on the basis of physical features of the diffraction patterns 2, which are difficult to copy.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An optical data carrier having diffraction patterns arranged along at least one data track, wherein each diffraction pattern represents a bit sequence with n bits and is selected in accordance with the bit sequence to be represented from a set of m different diffraction patterns where n is less than m, each said diffraction pattern being arranged to diffract a light beam which impinges thereon in a defined direction of incidence as beam portions in predetermined reflection directions, the number of said reflection directions of said set of diffraction patterns being equal to the number n of bits in said bit sequence and each bit in said bit sequence being associated with a different reflection direction, wherein the intensity of each said beam portion determines the value of the corresponding bit.

2. An optical data carrier according to claim 1 wherein the number m is an integral power of the number 2 and the relationship $m=2^n$ is fulfilled.

3. An optical data carrier according to claim 1 wherein each said diffraction pattern is formed from at most n juxtaposed diffraction elements, each said diffraction element being arranged to diffract the light of said light beam impinging thereon in one of said reflection directions.

4. An optical data carrier according to claim 3 wherein said diffraction elements are relief structures with a symmetrical profile.

5. An optical data carrier according to claim 3 wherein said diffraction elements are relief structures with an asymmetrical profile.

6. An optical data carrier according to claim 3 wherein said diffraction elements are relief structures which can be altered by applying thermal energy so that said data carrier is once writable.

7. An optical data carrier having diffraction patterns arranged along at least one data track, wherein each diffraction pattern represents a bit sequence with n bits and is selected in accordance with the bit sequence to be represented from a set of m different diffraction patterns wherein $2^n<m$, each said diffraction pattern being arranged to diffract a light beam which impinges thereon in a defined direction of incidence as beam portions in predetermined reflection directions, the number k of said reflection directions of said set of diffraction patterns being smaller than the number n of bits in said bit sequence, wherein each bit in said bit sequence is associated with a predetermined reflection direction, and wherein the intensity of each said beam portion determines the value of the bits associated therewith.

8. An optical data carrier according to claim 7 wherein each said diffraction pattern is formed from at most n juxtaposed diffraction elements, each said diffraction element being arranged to diffract the light of said light beam impinging thereon in one of said reflection directions.

9. An optical data carrier according to claim 8 wherein said diffraction elements are relief structures with a symmetrical profile.

10. An optical data carrier according to claim 8 wherein said diffraction elements are relief structures with an asymmetrical profile.

11. An optical data carrier according to claim 8 wherein said diffraction elements are relief structures which can be altered by applying thermal energy so that said data carrier is once writable.

12. A reading device for an optical data carrier according to claim 1, the reading device comprising: an optical reading head, having a light source for generating a light beam and a plurality of photodetectors, one said photodetector being provided for each said reflection direction of the optical data carrier, and a control and evaluation circuit; wherein, in the operation of reading the data carrier, the light source irradiates one said diffraction pattern after the other with said light beam in a predetermined direction, and the control and evaluation circuit determines the value of each bit of said bit sequence from signals output by the photodetectors.

13. A reading device for an optical data carrier according to claim 7, the reading device comprising: an optical reading head, having a light source for generating a light beam and a plurality of photodetectors, one said photodetector being provided for each said reflection direction of the optical data carrier, and a control and evaluation circuit; wherein, in the operation of reading the data carrier, the light source irradiates one said diffraction pattern after the other with said light beam in a predetermined direction, and the control and evaluation circuit determines the value of each bit of said bit sequence from signals output by the photodetectors.

\* \* \* \* \*